United States Patent
Junkins et al.

(10) Patent No.: US 6,975,318 B2
(45) Date of Patent: Dec. 13, 2005

(54) POLYGON BINNING PROCESS FOR TILE-BASED RENDERING

(75) Inventors: Stephen Junkins, Bend, OR (US); Oliver A. Heim, Portland, OR (US); Lance R. Alba, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 104 days.

(21) Appl. No.: 10/184,091

(22) Filed: Jun. 25, 2002

(65) Prior Publication Data

US 2003/0234792 A1 Dec. 25, 2003

(51) Int. Cl.⁷ .............................................. G06T 17/20
(52) U.S. Cl. ..................... 345/423; 345/420; 345/421; 345/427; 345/428; 345/582; 345/620; 345/621; 345/622
(58) Field of Search ................................ 345/420, 421, 345/423, 581, 620–622, 427, 428, 523, 582

(56) References Cited

U.S. PATENT DOCUMENTS

| | | |
|---|---|---|
| 4,600,919 A | 7/1986 | Stern |
| 4,747,052 A | 5/1988 | Hishinuma et al. |
| 4,835,712 A | 5/1989 | Drebin et al. |
| 4,855,934 A | 8/1989 | Robinson |
| 4,901,064 A | 2/1990 | Deering |
| 5,124,914 A | 6/1992 | Grangeat |
| 5,163,126 A | 11/1992 | Einkauf et al. |
| 5,371,778 A | 12/1994 | Yanof et al. |
| 5,611,030 A | 3/1997 | Stokes |
| 5,731,819 A | 3/1998 | Gagne et al. |
| 5,757,321 A | 5/1998 | Billyard |
| 5,786,822 A | 7/1998 | Sakaibara et al. |
| 5,805,782 A | 9/1998 | Foran |
| 5,809,219 A | 9/1998 | Pearce et al. |
| 5,812,141 A | 9/1998 | Kamen et al. |
| 5,847,712 A | 12/1998 | Salesin et al. |
| 5,894,308 A | 4/1999 | Isaacs |
| 5,929,860 A | 7/1999 | Hoppe |
| 5,933,148 A | 8/1999 | Oka et al. |
| 5,949,969 A | 9/1999 | Suzuoki et al. |
| 5,966,133 A | 10/1999 | Hoppe |
| 5,966,134 A | 10/1999 | Arias |
| 5,974,423 A | 10/1999 | Margolin |
| H1812 H | * 11/1999 | Arcuri ........................ 345/428 |
| 5,977,983 A | * 11/1999 | Einkauf et al. ............. 345/582 |
| 6,054,999 A | 4/2000 | Strandberg |
| 6,057,859 A | 5/2000 | Handelman et al. |
| 6,078,331 A | 6/2000 | Pulli et al. |
| 6,115,050 A | 9/2000 | Landau et al. |

(Continued)

OTHER PUBLICATIONS

Alliez et al., "Progressive Compression for Lossless Transmission of Triangle Meshes," *ACM SIGGRAPH 2001*, pp. 195—202 (2001).

Appel, Arthur, "The Notion of Quantitative Invisibility and the Machine Rendering of Solids." Proceedings of 22nd National Conference Association for Computing Machinery 1967.

Bajaj et al., "Progressive Compression and Transmission of Arbitrary Triangular Meshes," *IEEE*, pp. 307—316 (1999).

(Continued)

*Primary Examiner*—Matthew C. Bella
*Assistant Examiner*—Antonio Caschera
(74) *Attorney, Agent, or Firm*—Fish & Richardson P.C.

(57) ABSTRACT

Binning polygons in a three-dimensional graphics system includes constructing a first bounding box around a first-level polygon, the first bounding box including tiles that contain the first-level polygon, subdividing the first-level polygon into second-level polygons if the first bounding box exceeds a predetermined size, and constructing bounding boxes around each second-level polygon. The second bounding box includes fewer tiles than the first bounding box.

29 Claims, 6 Drawing Sheets

U.S. PATENT DOCUMENTS

| | | |
|---|---|---|
| 6,175,655 B1 | 1/2001 | George et al. |
| 6,191,787 B1 | 2/2001 | Lu et al. |
| 6,191,796 B1 | 2/2001 | Tarr |
| 6,198,486 B1 | 3/2001 | Junkins et al. |
| 6,201,549 B1 | 3/2001 | Bronskill |
| 6,208,347 B1 | 3/2001 | Migdal et al. |
| 6,219,070 B1 | 4/2001 | Baker et al. |
| 6,239,808 B1 | 5/2001 | Kirk et al. |
| 6,252,608 B1 | 6/2001 | Snyder et al. |
| 6,262,737 B1 | 7/2001 | Li et al. |
| 6,262,739 B1 | 7/2001 | Migdal et al. |
| 6,292,192 B1 | 9/2001 | Moreton |
| 6,317,125 B1 | 11/2001 | Persson |
| 6,337,880 B1 | 1/2002 | Cornog et al. |
| 6,388,670 B2 | 5/2002 | Naka et al. |
| 6,405,071 B1 | 6/2002 | Analoui |
| 6,424,345 B1 * | 7/2002 | Smith et al. ................ 345/423 |
| 6,437,782 B1 | 8/2002 | Pieragostini et al. |
| 6,478,680 B1 | 11/2002 | Yoshioka et al. |
| 6,559,848 B2 | 5/2003 | O'Rourke |
| 6,593,924 B1 | 7/2003 | Lake et al. |
| 6,593,927 B2 | 7/2003 | Horowitz et al. |
| 6,608,625 B1 * | 8/2003 | Chin et al. .................. 345/501 |
| 6,608,627 B1 | 8/2003 | Marshall et al. |
| 6,608,628 B1 | 8/2003 | Ross et al. |
| 6,674,433 B1 * | 1/2004 | Junkins ...................... 345/423 |
| 2001/0026278 A1 | 10/2001 | Arai et al. |
| 2002/0101421 A1 | 8/2002 | Pallister |
| 2002/0190983 A1 * | 12/2002 | Naoi .......................... 345/423 |
| 2003/0122850 A1 * | 7/2003 | Koneru et al. .............. 345/620 |

OTHER PUBLICATIONS

Buck et al., "Performance–Driven Hand Drawn Animation", *ACM* (NPAR2000), pp. 101—108 (2000).

Catmull et al., "Recursively Generated B–Spline Surfaces on Arbitrary Topological Meshes," Computer Aided Design, 10(6):350—255 (1978).

Chow, M., "Optimized Geometry Compression for Real–time Rendering," *IEEE*, pp. 347–354 (1997).

Coelho et al., "An Algorithm for Intersecting and Trimming Parametric Meshes", *ACM* SIGGRAPH, pp. 1—8 (1998).

Cohen–Or, D. et al., "Progressive Compression of Arbitrary Triangular Meshes," *IEEE Visualization 99* Conference Proc., pp. 67—72 (1999).

Deering, M., "Geometry Compression," *Computer Graphics*. SIGGRAPH '95, pp. 13–20, 1995.

DeRose et al., "Subdivisional Surfaces in Character Animation", *ACM*, SIGGRAPH'98, pp. 84—94 (1998).

Dyn, N. et al., "A Butterfly Subdivision Scheme for Surface Interpolation with Tension Control," *ACM Transactions on Graphics*, 9(2):160–13 169 (1990).

Elber, Gershon, "Line Art Rendering via a Coverage of Isoperimetric Curves," IEEE Transactions on Visualization and Computer Graphics, 1(3):231–13 239 (1995).

Elber, Gershon, "Interactive Line Art Rendering of Freeform Surfaces", *Eurographics'99*, 18(3):C1–C12 (1999).

Gooch et al., "A Non–Photorealistic Lighting Model for Automatic Technical Illustration," *Computer Graphics Proceedings, Annual Conference Series, SIGGRAPH'98*, pp. 447–452 (1998).

Gooch et al., "Interactive Technical Illustration," *ACM Interactive 3D*, pp. 31—38 (1999).

Heidrich et al., "Realistic, Hardware–Accelerated Shading and Lighting," *ACM*, (SIGGRAPH'99), pp. 171—178 (1999).

Hoppe, H., "Progressive Meshes," URL: http://www.research.microsft.com/research/graphics/hoppe/, (10 pgs.).

Hoppe, H., "Efficient Implementation of Progressive Meshes," Comput. & Graphics, 22(1), pp. 27—36 (1998).

Hoppe, H., "View–Dependent Refinement of Progressive Meshes", URL: http://www.research.microsoft.com/~hoppe/ (10 pgs.).

Kumar et al., "Interactive Display of Large Scale NURBS Models", *ACM*, Symp. On Interactive 3D Graphics, pp. 51—58 (1995).

Lake et al., "Stylized Rendering Techniques for Scalable Real–Time 3D Animation", NPAR, pp. 101—108 (2000).

Lander, Jeff, "Making Kine More Flexible,"Game Developer Magazine, 5 pgs., Nov. 1998.

Lander, Jeff, "Skin Them Bones," Game Developer Magazine, 4 pgs., May 1998.

Lansdown et al., "Expressive Rendering: A Review of Nonphotorealistic Techniques," IEEE Computer Graphics & Applications, pp. 29–37 (1995).

Lasseter, J. et al., "Principles of Traditional Animation Applied to 3D Computer Animation," *ACM*, pp. 35—44 (1987).

Lee, M. et al., "Navigating Through Triangle Meshes Implemented as Linear Quadtrees," *ACM Transactions on Graphics*, 19(2):79—121 (2000).

Lewis, J. P. et al., "Pose Space Deformation: A Unified Approach to Shape Interpolation and Skeleton–Driven Deformation," *ACM*, (SIGGRAPH 2000), pp. 165—172 (2000).

Ma et al., "Extracting Feature Lines for 3D Unstructured Grids," *IEEE*, pp. 285—292 (1997).

Markosian, L. et al., "Real–Time Nonphotorealistic Rendering," SIGGRAPH'97, 6 pgs. (1997).

Pajarola et al., "Compressed Progressive Meshes" *IEEE Transactions on Visualization and Computer Graphics*, 6(1)79—93 (2000).

Pedersen, "A Framework for Interactive Texturing on Curved Surfaces", *ACM*, pp. 295–301 (1996).

"pmG Introduces Messiah: Animate 3.0", URL: http://www.digitalproducer.com/aHTM/Articles/july_2000/july_17_00/pmg_intros_messiah_animate.htm (Accessed Oct. 26, 2004) 2 pgs.

Popovic et al., "Progressive Simplicial Complexes" Microsoft Research, http://www.research.microsft.com/~hoppe/.

Pueyo, X. et al., "Rendering Techniques '96, " Proc. of Eurographics Rendering Workshop 1996, EUROGRAPHICS, pgs. 61—70 (1996).

Raskar, R. et al., "Image Precision Silhouette Edges," Symposium on Interactive 3D Graphics, *ACM*, pp. 135–231 (1999).

Rockwood, A. et al., "Real–time Rendering of Trimmed Surfaces," Computer Graphics (SIGGRAPH '89 Proceedings) 23:107—116 (1989).

Samet, Hanan, "Applications of Spatial Data Structures: Computer Graphics, Image Processing, and GIS," University of Maryland, Addison–Wesley Publishing Company, 1060–1064, Reading, MA, Jun. 1990.

Sousa, M., et al., "Computer–Generated Graphite Pencil Rendering of 3–D Polygonal Models", Eurographics'99, 18(3):C195—C207 (1999).

Stam, J., "Exact Evaluation of Catmull–Clark Subdivision Surfaces at Arbitrary Parameter Values", SIGGRAPH 98 Conference Proceedings, Annual Conference Series, pp. 395–404 (1998).

Taubin et al., "3D Geometry Compression", SIGGRAPH'98 Course Notes (1998).

Taubin et al., "Progressive Forest Spilt Compression," IBM T.J. Watson Research Center, 9 pgs. (1998).

Thomas (Contributor) et al., "The Illusion of Life: Disney Animation" 47–51.

Wilhelms, J. & Van Gelder, A., "Anatomically Based Modeling," Univ. California Santa Cruz [online], 1997 [retrieved Dec. 22, 2004], retrieved from the Internet: <URL: http://graphics.stanford.edu/courses/cs448-01-spring/papers/wilhelms.pdf>.

Zeleznik et al., "SKETCH: An Interface for Sketching 3D Scenes" Brown University site of the NSF Science and Technology Center for Computer Graphics and Scientific Visualization, 1996.

Zorin "Interpolation Subdivision for Meshes With Arbitrary Topology" Department of Computer Science, California Institute of Technology, Pasadena, CA.

Beets, Kristof, "PVRSG Tile Based Rendering" A technical article posted to the web: http://www.ping.be/powervr/PVSGRendMain.htm, 1998.

* cited by examiner

POLYGON BINNING PROCESS FOR TILE-BASED RENDERING

TECHNICAL FIELD

This application relates to a polygon (e.g., triangle) binning process for use in a tile-based rendering system.

BACKGROUND

A virtual 3D model (or simply "3D model") is comprised of polygons, such as triangles, which represent the skin of the 3D model. A rasterization engine draws polygons from the 3D model onto a two-dimensional (2D) surface, such as a computer screen. Typical rasterization engines draw the entire frame buffer at once. A more efficient method is to break up the frame buffer into individual subsections (tiles) and to render them individually. Each tile includes one or more polygons or, more typically, a portion of one or more polygons.

To reduce the amount of tiles that each polygon is assigned to, a polygon binning process may be used. A polygon binning process excludes tiles that do not include any polygons or portions thereof prior to rasterization. The binning process also accomplishes some rasterization setup by identifying which polygons are contained by each tile. By doing this, the amount of processing that must be performed by the rasterization engine is reduced.

DESCRIPTION OF THE DRAWINGS

Like reference numerals in different figures indicate like elements.

DESCRIPTION

Figure 1:
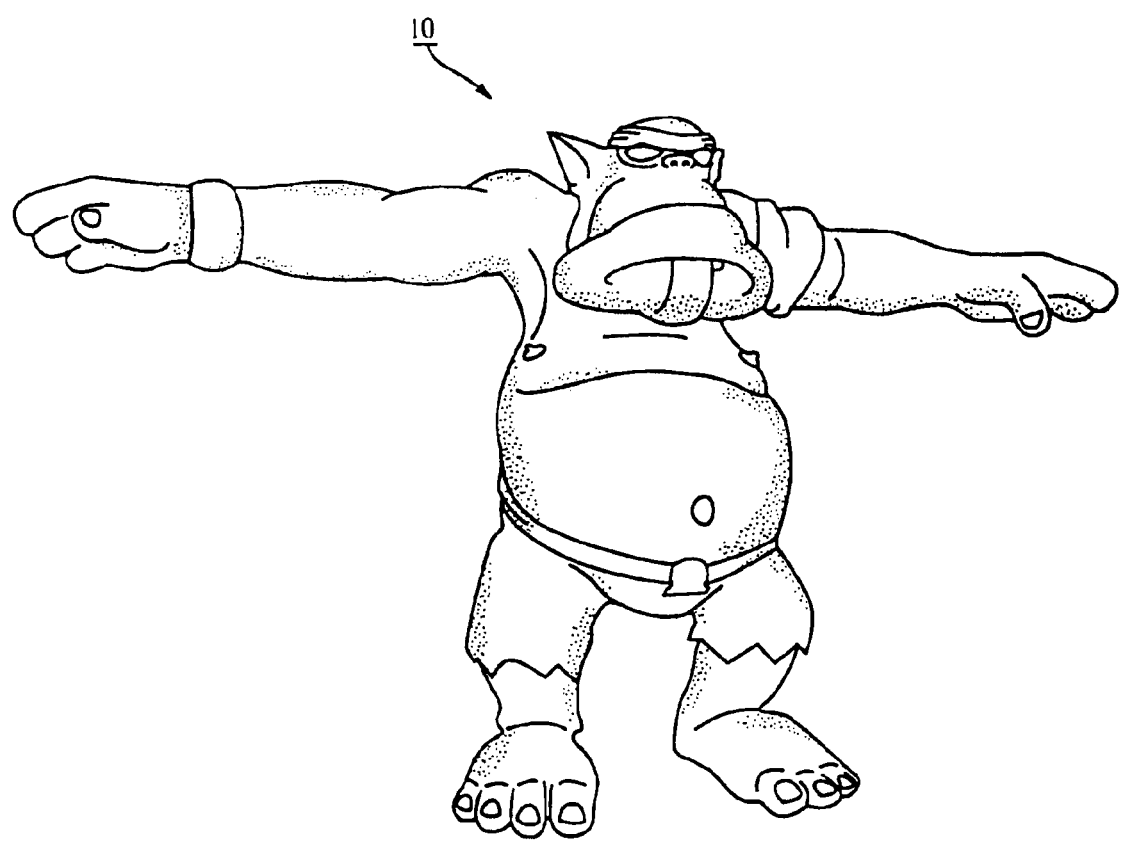
FIG. 1 is a view of a 3D model.
Figure 2:
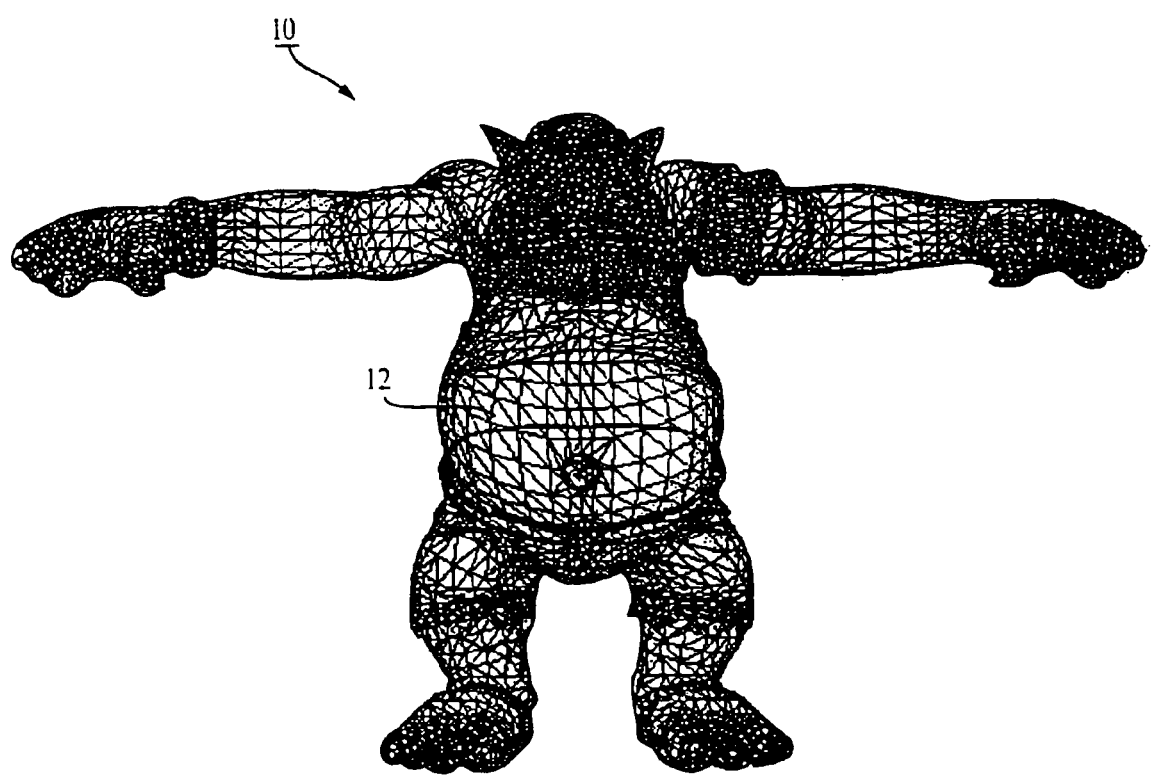
FIG. 2 is a view of polygons that make up the 3D model.

FIG. 1 shows a 3D model 10, which is rendered from 3D data. As shown in FIG. 2, 3D model 10 is comprised of interconnecting polygons 12. Polygons 12 are triangles in this embodiment; however, other types of polygons may be used. Polygons 12 define the "skin" surface of 3D model 10.

The animation of 3D model 10 is defined by a sequence of frames, which constitute snapshots of the 3D model at different points in time. Each frame contains information about the position of the 3D model in 3D space at a particular point in time. Data (i.e., polygons) for each frame of the animation is stored in frame buffer memory. The frame buffer can be subdivided into smaller portions called tiles. The frame buffer stores the polygons in these tiles which, in this context, are rectangular (e.g., square) portions of memory. One or more polygons may occupy a single tile or, alternatively, a single polygon may occupy several tiles. The latter is assumed in the description of the polygon binning process that follows.

Current tiling processes may overestimate the number of tiles to which a polygon belongs. Improving the accuracy of this estimation reduces needless computations. The processes describe herein demonstrate such an improvement.

Figure 3:
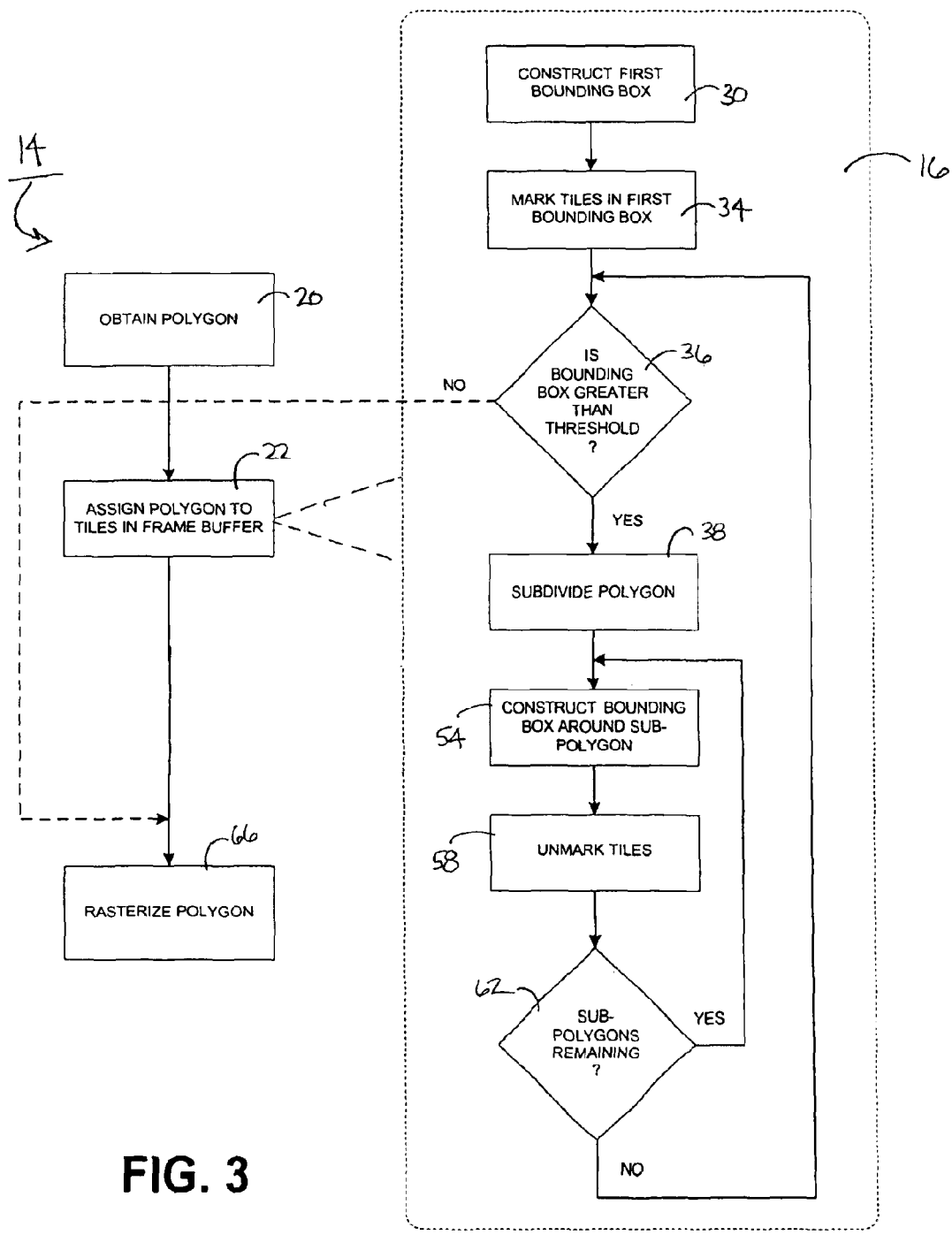
FIG. 3 is a flowchart of a polygon binning process.

Referring to FIG. 3, a process 14 is shown for drawing polygons on a 2D computer screen. Process 14 includes a polygon binning process 16, which reduces the number of tiles that a polygon is assigned to in a frame buffer.

The frame buffer is divided into individual tiles prior to binning. For example, a typical frame buffer might be 512×512 pixels. A typical size of a tile might be 32×32 pixels, yielding a partitioning of 16×16 tiles.

Figure 4:
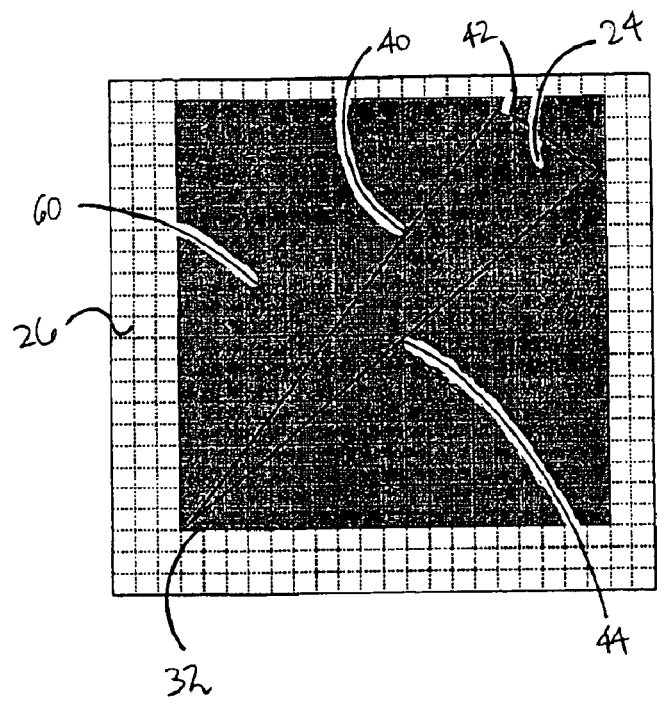
FIG. 4 is a block diagram of tiles in a frame buffer, a polygon contained in the tiles, and a bounding box.

Process 14 obtains (20) polygons from a 3D animation sequence. The polygons may be obtained from a single frame of the 3D animation. Process 14 assigns (22) polygons from the frame to tiles in a frame buffer. FIG. 4 shows an example of a polygon 24 and tiles 26 in the frame buffer. As shown, polygon 24 extends over a number of tiles in the frame buffer.

When assigning polygons to tiles in the frame buffer, process 14 performs polygon binning process 16. Polygon binning process 16 includes constructing (30) a bounding box 32 around polygon 24 (FIG. 4) in the frame buffer. The bounding box may be a rectangle that is just large enough to encompass the entirety of polygon 24 without including excess tiles along either the X-axis or the Y-axis. Process 16 marks (34) the tiles of the frame buffer that are within bounding box 32. Marking the tiles in this manner distinguishes tiles inside the bounding box from tiles outside the bounding box.

Process 16 determines (36) if the size of the bounding box exceeds a predetermined threshold, e.g., if the X-dimension of the bounding box exceeds a threshold and/or the Y-dimension of the bounding box exceeds the same, or a different, threshold. If the size of the bounding box exceeds the threshold (36), process 16 subdivides (38) the polygon into lower-level sub-polygons. What is meant by "lower-level" here is that, combined, the sub-polygons make up the undivided "parent" polygon and that each of the sub-polygons is smaller in area than its parent polygon.

Figure 5:
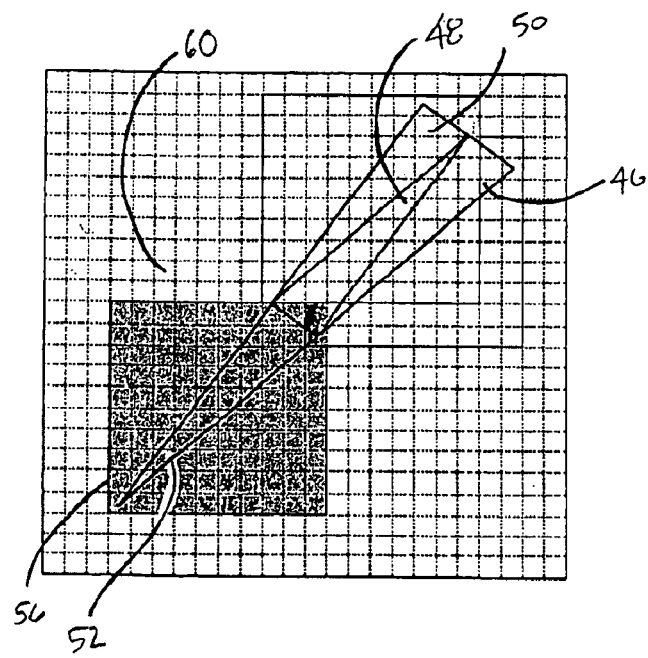
FIG. 5 is a view of sub-polygons derived from the polygon of FIG. 4 and a bounding box of one of the sub-polygons.

Process 16 subdivides (38) polygon 24 by obtaining the mid-points of each edge 40, 42 and 44 of the polygon. Process 16 connects the mid-points of each edge to produce four new sub-polygons 46, 48, 50 and 52 (FIG. 5). Process 16 selects one of these sub-polygons 52 and constructs (54) a lower level bounding box 56 around sub-polygon 52. Bounding box 56 around sub-polygon 52 is constructed in the same manner as bounding box 32 around polygon 24. As shown, a sum of all tiles included in the lower-level bounding box comprises fewer tiles than the parent-level bounding box. Process 16 unmarks (58) tiles that were within bounding box 32 but not within bounding box 56. An example of a tile that is unmarked is tile 60 (FIGS. 4 and 5). As described below, only the tiles that are marked are eventually rasterized onto the 2D surface.

Process 16 determines (62) if there are any sub-polygons remaining from the subdivision performed in block 38 that have not yet been processed. If so, process 16 selects one of the remaining sub-polygons and performs blocks 54, 58 and 62 on the selected sub-polygon. Process 16 repeats this until all of the sub-polygons have been processed.

Figure 6:
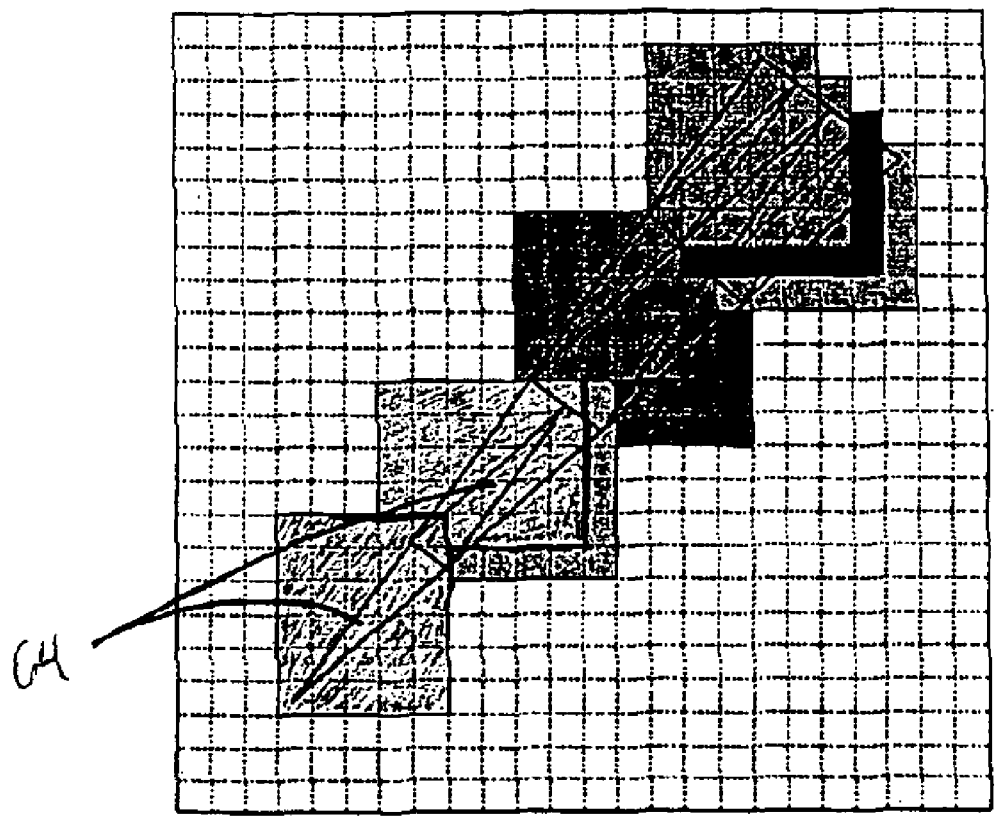
FIG. 6 is a view of lower-level sub-polygons derived from the sub-polygon of FIG. 5 and the bounding boxes of these sub-polygons.

Process 16 determines (36) if the size of a bounding box around a sub-polygon (e.g., 52) exceeds the predetermined threshold. This may be done during or after processing of the sub-polygons. If the size of the bounding box exceeds the predetermined threshold, process 16 selects each of the sub-polygons, in turn, and performs blocks 38, 54, 58 and 62 on the selected sub-polygons. This process results in lower-level sub-polygons 64 (FIG. 6) and is repeated until the size(s) of the bounding box(es) for the resulting sub-polygons do not exceed the predetermined threshold. Reducing the sizes of the bounding boxes reduces the number of tiles to which a polygon is assigned, and thus reduces the number of tiles that need to be rasterized when the image is displayed.

Once the polygon binning process (16) has been completed, process 14 implements a tile clipping process to remove unused tiles and rasterizes (66) the tiles containing the polygons on a 2D surface. Process 14 excludes the unmarked tiles, meaning that the unmarked tiles are not rasterized. Process 14 rasterizes only those tiles that are marked, which correspond to a polygon or portion(s) thereof.

Figure 7:
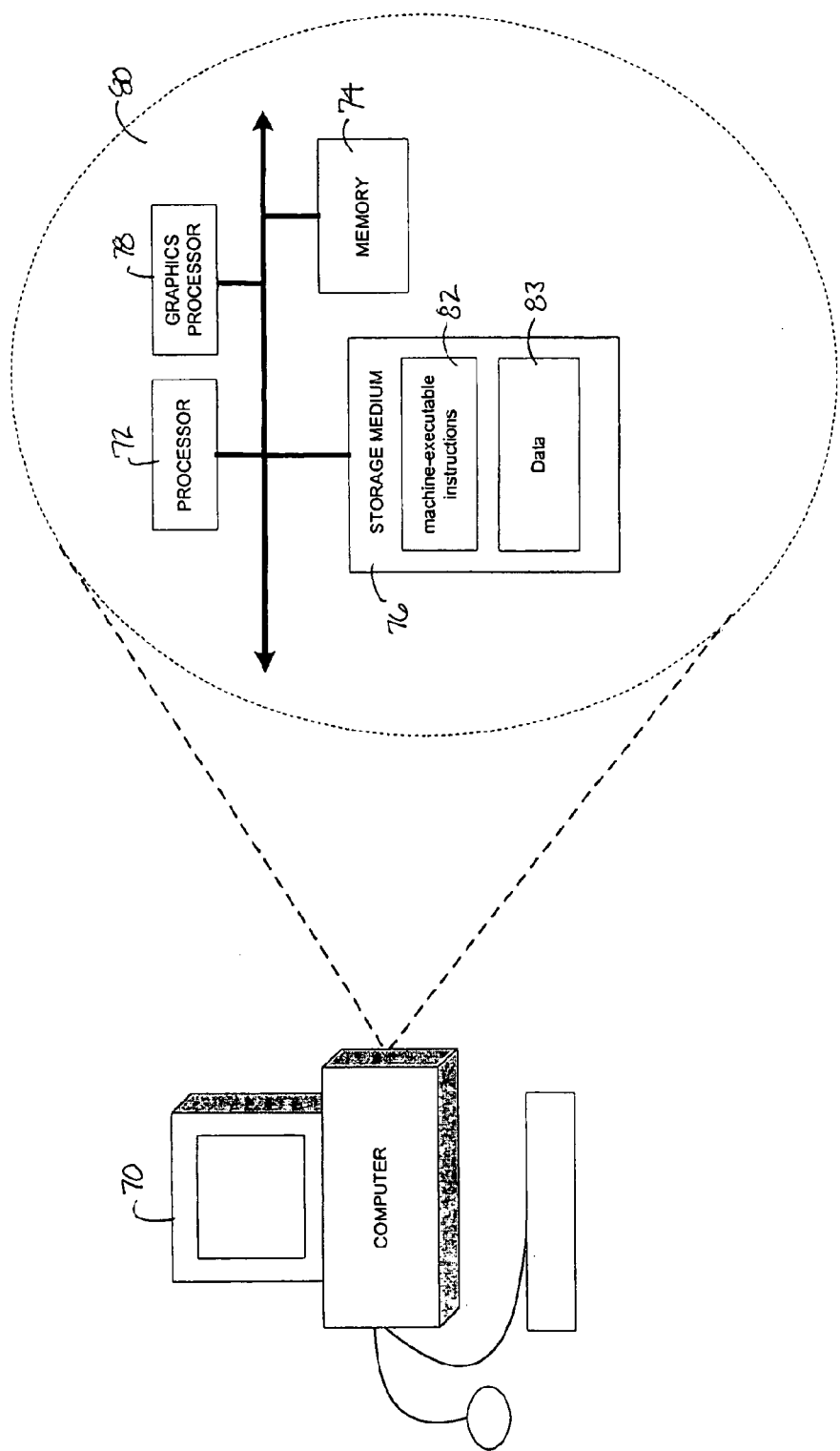
FIG. 7 is a view of computer hardware on which the process of FIG. 3 may be implemented.

FIG. 7 shows a computer 70 for performing process 14. Computer 70 includes a processor 72, a memory 74, a storage medium 76 (e.g., a hard disk), and a 3D graphics processor 78 for processing 3D data (see view 80). Storage medium 76 stores 3D data 83 that defines the 3D model, and machine-executable instructions 82, which are executed by processor 72 out of memory 74 to perform process 14 on 3D data 83.

Process 14, however, is not limited to use with the hardware and software of FIG. 7; it may find applicability in any computing or processing environment. Process 14 may be implemented in hardware, software, or a combination of the two. For example, process 14 may be implemented using circuitry, such as one or more of programmable logic (e.g., an ASIC—Application-Specific Integrated Circuit), logic gates (e.g., AND, OR, NAND gates), a processing device (e.g., a microprocessor, controller), and a memory.

Process 14 may be implemented in computer programs executing on programmable computers that each includes a processor, a storage medium readable by the processor (including volatile and non-volatile memory and/or storage elements), at least one input device, and one or more output devices. Program code may be applied to data entered using an input device, such as a mouse or a keyboard, to perform process 14 and to generate output information.

Each such program may be implemented in a high level procedural or object-oriented programming language to communicate with a computer system. However, the programs can be implemented in assembly or machine language. The language may be a compiled or an interpreted language.

Each computer program may be stored on an article of manufacture, such as a storage medium (e.g., CD-ROM, hard disk, or magnetic diskette) or device (e.g., computer peripheral), that is readable by a general or special purpose programmable computer for configuring and operating the computer when the storage medium or device is read by the computer to perform process 14. Process 14 may also be implemented as a machine-readable storage medium, configured with a computer program, where, upon execution, instructions in the computer program cause a machine to operate in accordance with process 14.

Other embodiments not described herein are also within the scope of the following claims. For example, the blocks of FIG. 3 may be rearranged and/or executed out of order to produce a similar result. The processes described herein may be implemented on full-size machines or hand-held devices.

What is claimed is:

1. A method of binning polygons in a three-dimensional graphics system, comprising:
   constructing a first-level bounding box around a first-level polygon, the first-level bounding box including tiles that overlap the first-level polygon;
   subdividing the first-level polygon into second-level polygons if the first-level bounding box exceeds a predetermined size;
   constructing a second-level bounding box around each second-level polygon, wherein a sum of all tiles included in each second-level bounding box comprises fewer tiles than the first-level bounding box; and
   performing one or more divisions of the second-level polygon and of sub-polygons resulting from division of the second-level polygon until bounding boxes for all sub-polygons do not exceed the predetermined size.

2. The method of claim 1, further comprising:
   marking the tiles included in the first-level bounding box; and
   unmarking tiles included in the first-level bounding box but not included in any of the second-level bounding boxes.

3. The method of claim 1, wherein:
   the first-level polygon comprises a triangle; and
   subdividing comprises:
     obtaining mid-points of edges of the triangle; and
     connecting the mid-points to form the second-level polygons.

4. The method of claim 1, wherein the first-level polygon has a larger area than each of the second-level polygons.

5. The method of claim 1, wherein performing comprises:
   subdividing the second-level polygon into third-level polygons if the second-level bounding box exceeds a predetermined size;
   constructing a third-level bounding box around each third-level polygon, wherein a sum of all tiles included in each third-level bounding box comprises fewer tiles than the second-level bounding box; and
   excluding tiles from the third-level bounding box that are not included in the second-level bounding box.

6. The method of claim 5, further comprising:
   unmarking tiles included in the second-level bounding box that are not included in the third-level bounding boxes.

7. A three-dimensional graphics system, comprising:
   obtaining polygons that define a frame of three-dimensional data;
   performing a polygon binning process on a polygon; and
   assigning the polygon to tiles in a memory buffer;
   wherein the polygon binning process comprises:
     subdividing the polygon to obtain sub-polygons;
     defining a bounding box around each of the sub-polygons;
     removing tiles around the bounding boxes; and
     performing one or more divisions of the sub-polygons and of successive sub-polygons resulting from division of the sub-polygons until bounding boxes for all resulting sub-polygons are less than a predetermined size.

8. The system of claim 7, wherein:
   the polygon binning process further comprises defining a parent bounding box around the polygon; and
   removing comprises excluding tiles from parent-level bounding boxes that are not included in bounding boxes corresponding to each of the sub-polygons.

9. The system of claim 7, wherein:
the polygon comprises a triangle; and
subdividing comprises:
   obtaining mid-points of edges of the triangle; and
   connecting the mid-points to form the sub-polygons.

10. An article comprising a machine-readable medium which stores executable instructions to bin polygons in a three-dimensional graphics system, the instructions causing a machine to:
   construct a first-level bounding box around a first-level polygon, the first-level bounding box including tiles that overlap the first-level polygon;
   subdivide the first-level polygon into second-level polygons if the first-level bounding box exceeds a predetermined size;
   construct a second-level bounding box around each second-level polygon, wherein a sum of all tiles included in each second-level bounding box comprises fewer tiles than the first-level bounding box; and
   perform one or more divisions of the second-level polygon and of sub-polygons resulting from division of the second-level polygon until all bounding boxes for sub-polygons do not exceed the predetermined size.

11. The article of claim 10, further comprising instructions that cause the machine to:
   mark the tiles included in the first-level bounding box; and
   unmark tiles included in the first-level bounding box but not included in any of the second-level bounding boxes.

12. The article of claim 10, wherein:
the first-level polygon comprises a triangle; and
subdividing comprises:
   obtaining mid-points of edges of the triangle; and
   connecting the mid-points to form the second-level polygons.

13. The article of claim 10, wherein the first-level polygon has a larger area than each of the second-level polygons.

14. The article of claim 10, wherein the instructions to perform one or more divisions comprise instructions to:
   subdivide the second-level polygon into third-level polygons if the second-level bounding box exceeds a predetermined size;
   construct a third-level bounding box around each third-level polygon, wherein a sum of all tiles included in each third-level bounding box comprises fewer tiles than the second-level bounding box; and
   exclude tiles from the third-level bounding box that are not included in the second-level bounding box.

15. The article of claim 14, further comprising instructions that cause the machine to:
   unmark tiles included in the second-level bounding box that are not included in the third-level bounding boxes.

16. An article comprising a machine-readable medium which stores executable instructions to bin polygons in a three-dimensional graphics system, the instructions causing a machine to:
   obtain polygons that define a frame of three-dimensional data;
   perform a polygon binning process on a polygon; and
   assign the polygon to tiles in a memory buffer;
   wherein the polygon binning process comprises:
      subdividing the polygon to obtain sub-polygons;
      defining a bounding box around each of the sub-polygons;
      removing tiles around the bounding boxes; and
      perform one or more divisions of the sub-polygons and of successive sub-polygons resulting from division of the sub-polygons until bounding boxes for all resulting sub-polygons are less than a predetermined size.

17. The article of claim 16, wherein:
the polygon binning process further comprises defining a parent bounding box around the polygon; and
removing comprises excluding tiles from parent-level bounding boxes that are not included in bounding boxes corresponding to each of the sub-polygons.

18. The article of claim 16, wherein:
the polygon comprises a triangle; and
subdividing comprises:
   obtaining mid-points of edges of the triangle; and
   connecting the mid-points to form the sub-polygons.

19. An apparatus to bin polygons in a three-dimensional graphics system, the apparatus comprising circuitry to:
   construct a first-level bounding box around a first-level polygon, the first-level bounding box including tiles that overlap the first-level polygon;
   subdivide the first-level polygon into second-level polygons if the first-level bounding box exceeds a predetermined size;
   construct a second-level bounding box around each second-level polygon, wherein a sum of all tiles included in each second-level bounding box comprises fewer tiles than the first-level bounding box; and
   perform one or more divisions of the second-level polygon and of sub-polygons resulting from division of the second-level polygon until bounding boxes for all sub-polygons do not exceed the predetermined size.

20. The apparatus of claim 19, wherein the circuitry:
marks the tiles included in the first-level bounding box; and
unmarks tiles included in the first-level bounding box but not included in any of the second-level bounding boxes.

21. The apparatus of claim 19, wherein:
the first-level polygon comprises a triangle; and
subdividing comprises:
   obtaining mid-points of edges of the triangle; and
   connecting the mid-points to form the second-level polygons.

22. The apparatus of claim 19, wherein the first-level polygon has a larger area than each of the second-level polygons.

23. The apparatus of claim 19, wherein in performing the one or more divisions, the circuitry:
   subdivides the second-level polygon into third-level polygons if the second-level bounding box exceeds a predetermined size;
   constructs a third-level bounding box around each third-level polygon, wherein a sum of all tiles included in each third-level bounding box comprises fewer tiles than the second-level bounding box; and
   excludes tiles from the third-level bounding box that are not included in the second-level bounding box.

24. The apparatus of claim 23, wherein the circuitry:
unmarks tiles included in the second-level bounding box that are not included in the third-level bounding boxes.

25. The apparatus of claim 19, wherein the circuitry comprises at least one of a processor, a memory, programmable logic, and logic gates.

26. An apparatus to bin polygons in a three-dimensional graphics system, the apparatus comprising circuitry to:
  obtain polygons that define a frame of three-dimensional data;
  perform a polygon binning process on a polygon; and
  assign the polygon to tiles in a memory buffer;
  wherein the polygon binning process comprises:
    subdividing the polygon to obtain sub-polygons;
    defining a bounding box around each of the sub-polygons;
    removing tiles around the bounding boxes; and
    perform one or more divisions of the sub-polygons and of successive sub-polygons resulting from division of the sub-polygons until bounding boxes for all resulting sub-polygons are less than a predetermined size.

27. The apparatus of claim 26, wherein:
  the polygon binning process further comprises defining a parent bounding box around the polygon; and
  removing comprises excluding tiles from parent-level bounding boxes that are not included in bounding boxes corresponding to each of the sub-polygons.

28. The apparatus of claim 26, wherein:
  the polygon comprises a triangle; and
  subdividing comprises:
    obtaining mid-points of edges of the triangle; and
    connecting the mid-points to form the sub-polygons.

29. The apparatus of claim 26, wherein the circuitry comprises at least one of a processor, a memory, programmable logic, and logic gates.

* * * * *